United States Patent [19]
Saville et al.

[11] Patent Number: 5,392,826
[45] Date of Patent: Feb. 28, 1995

[54] AIRCRAFT WASTE SYSTEM DRAIN VALVE

[76] Inventors: Eric J. Saville, 9325 Apricot Ave.;
Raymond S. Hunt, Jr., 10075 Hillside Rd., both of Alta Loma, Calif. 91701;
William R. Dunn, 266 Van Ness Ave., Upland, Calif. 91786

[21] Appl. No.: 37,024

[22] Filed: Mar. 25, 1993

Related U.S. Application Data

[62] Division of Ser. No. 715,676, Jun. 14, 1991, Pat. No. 5,197,515.

[51] Int. Cl.6 ............................................. F16K 1/20
[52] U.S. Cl. .................................. 137/800; 251/147; 220/259
[58] Field of Search ............... 251/147; 137/800, 613; 220/259; 4/323

[56] References Cited
U.S. PATENT DOCUMENTS

3,788,595  1/1974  Colonna ........................ 251/147 X
4,098,427  7/1978  Duckworth, Jr. ................. 220/259
4,127,215  11/1978  Morrison ........................ 220/259 X

*Primary Examiner*—John C. Fox
*Attorney, Agent, or Firm*—Boniard I. Brown

[57] ABSTRACT

A drain valve assembly for positively sealing an aircraft waste system drain line to prevent waste fluid leakage and the formation of so-called "blue ice" due to such leakage during high altitude flight. The valve assembly has an inlet for connection to the drain line, an outlet for connection to a waste drain hose of an airport waste disposal facility, and an outer valve cover and inner ball valve between the inlet and outlet which provide truly redundant seals for the drain port in flight, can be opened with relative ease when frozen, are relatively immune to improper sealing due to obstruction by waste, enable removal of a frozen waste blockage in the waste flow path without a sudden large waste dump, and permit inspection and easy replacement, if necessary, of the valve seals.

6 Claims, 4 Drawing Sheets

AIRCRAFT WASTE SYSTEM DRAIN VALVE

This is a divisional of application Ser. No. 07/715,676, filed on Jun. 14, 1991, U.S. Pat. No. 5,197,515.

BACKGROUND OF THE INVENTION

1. Field of the Invention

This invention relates generally to aircraft lavatory waste handling systems and more particularly to an improved drain valve for sealing an aircraft waste disposal drain line.

2. Prior Art

Commercial passenger airliners and other commercial aircraft have lavatories whose waste is collected, during flight, in one or more tanks on board the aircraft. These tanks are drained at airport facilities through drain lines on the aircraft having outlet ends which are located at waste disposal service panels on the exterior of the aircraft for connection to an airport waste disposal system. The outlet end of each drain line is normally closed by a sealing device or valve which is accessible at the respective service panel for operation between open and closed positions by aircraft servicing personnel. Also located at the service panels are handles for operating collecting tank drain valve(s) on the aircraft, and flush/fill ports for flushing and replenishing the collecting tank(s) after they have been drained.

One type of existing drain line sealing device is a bi-conduit valve including a body having an inlet for connection to the outlet end of an aircraft drain line, an outlet for connection to an airport drain hose, and a doughnut plug within the valve body which is extendable and retractable into and from a drain passage extending between the inlet and outlet. This plug, when extended into the drain passage, is expandable radially into fluid sealing and interlocking engagement with the wall of the passage in such a way as to seal the passage and lock the plug in sealing position. U.S. Pat. Nos. 3,954,123 and 4,027,701 disclose aircraft drain line sealing devices of this kind.

U.S. Pat. No. 4,098,427 discloses another type of existing aircraft drain line sealing device. This sealing device is a cap having an inlet for connection to the outlet end of an aircraft drain line, an outlet for connection to an airport drain hosed and two seals arranged in series along a waste passage extending between the inlet and outlet. One seal is a hinged outer valve cover which is pivotally movable between a closed position against a valve seat about the cap outlet and an open position spaced from the seat in which the cap outlet is accessible for connection to an airport drain hose. The other seal of the cap is an inner valve flapper pivotally mounted within the cap passage for swinging between a closed position against a valve seat about the passage and an open position spaced from the seat.

An aircraft waste collecting tank is emptied at an airport facility by connecting the outlet of the corresponding aircraft drain line sealing device to a drain hose at the facility and then opening the drain passage through the sealing device by retracting its sealing plug or opening its inner valve flapper, as the case may be, to permit the contents of the aircraft collecting tank to drain into the airport waste receiver. The empty aircraft collecting tank is then flushed and recharged, the airport drain hose is removed, and the aircraft drain line sealing device is reclosed.

The existing aircraft drain line sealing devices of this kind have many deficiencies. Perhaps the most serious of these is their tendency to leak toilet fluids. These toilet fluids are corrosive to aircraft structures and can also create a serious problem involving so-called "blue ice". The existing sealing devices are prone to leaking for the reasons explained below. Suffice it to say at this point that the very low ambient temperatures at normal aircraft cruising altitudes cause the leakage fluids to freeze almost instantaneously into what is commonly called "blue ice". This leakage of waste fluids, if it occurs, generally continues throughout most of the flight and results in the formation of a very sizeable blue ice mass which can, and often does, separate from the aircraft. Such a separated blue ice mass can cause serious damage to the aircraft structure or engines or fall to the ground and cause serious damage to buildings and injury to persons on the ground. Separation of blue ice from an aircraft is particularly prone to occur during descent of an aircraft from its cruising altitude due to the increase in ambient temperature which occurs with decreasing altitude.

A number of such blue ice separation incidents have occured in the past with very serious and potentially fatal consequences. In one such incident, for example, the separated blue ice mass was ingested into and caused abrupt stoppage of an engine. This abrupt stoppage of the engine, in turn, produced intense torsional stresses which caused complete separation of the engine from the aircraft. In another incident, the separated blue ice mass fell through and caused severe damage to a house. It is only a matter of time until such a blue ice separation incident causes death by striking a person on the ground or by loss of an entire aircraft.

The existing aircraft drain line sealing devices have certain characteristics construction and operation which either render these devices prone to the leakage problem just discussed or exacerbate the problem. For example, both the existing drain line sealing cap and plug devices have sealing surfaces which are exposed to direct impact by the waste being drained. These sealing surfaces are the surface of a seal ring on the inner valve flapper of the drain line sealing cap and the sealing surface which is engaged by the plug of the plug-type sealing device. The waste drained from an aircraft often contains sharp or hard objects, such as razor blades, hair pins, and the like, which can cut, score, or otherwise damage such sealing surfaces sufficiently to cause waste leakage in flight.

Another deficiency of the existing aircraft drain line sealing devices having inner hinged valve flappers resides in the fact that these flappers often do not seal properly due to the presence of a waste obstruction between the flappers and their valve seats. Thus, a hinged valve flapper opens and closes laterally of its valve seat, so that any obstruction remaining between the flapper and the seat when closing the flapper will prevent proper seating of the flapper and cause waste leakage. The inner valve flapper is particularly vulnerable to such improper seating since neither its upstream seating side nor its valve seat can be easily viewed to determine if any waste is adhering to the flapper or seat which might obstruct proper seating of the flapper. As a consequence, if the inner flapper is closed blindly without careful inspection of its seating side and its valve seat by the waste disposal crew, the flapper may not seat properly when closed. Such improper seating of the inner flapper is not readily evident in most cases until the valve leaks during the next flight with the resultant formation of blue ice or blue streaks on the aircraft skin or waste discharge occurs when the outer valve cover is opened during the next ground servicing of the waste disposal system, as discussed below. The existing plug-type drain line sealing devices are similarly deficient to a certain degree in that their interior sealing surfaces which are engaged by the doughnut plug are difficult to inspect for adhering waste material which might obstruct proper sealing of the waste passage through the cap by the plug.

The inner and outer seals, i.e. the inner doughnut plug or valve flapper and the outer valve cover, of the existing drain line sealing devices are intended to provide sealing redundancy. Leakage of the inner doughnut plug or valve flapper in flight has very undesirable consequences, however, even though the outer valve cover seals properly and thus prevents the formation of blue ice on the exterior of the aircraft. These undesirable consequences involve sudden discharge of the leaked waste onto the ground, onto equipment, and/or onto the waste disposal personnel when the outer cover is opened during the next servicing of the aircraft at an airline facility. This waste discharge is commonly referred to as a "dump", particularly if it is relatively sizeable as discussed below.

The existing drain line caps or valves of the kind disclosed in U.S. Pat. No. 4,098,427 are particularly prone to such "dumps". This is due to the fact that outer cover of these valves are designed to close the inner valve flapper when the cover is closed, and the valves have a latch which is intended to automatically lock the inner valve flapper closed upon its movement to its closed position by the cover. For this reason, waste disposal personnel are generally required to close the drain valve in only one step by closing the outer cover with the assumption that the inner valve flapper will thereby be latched closed. Due to the buildup of manufacturing tolerances, wear, and other factors, however, closure of the cover often does not result in latching of the inner flapper. In this case, not only does waste leak freely past the inner flapper in flight, but opening of the outer cover on the ground permits the inner flapper to immediately open wide by the pressure of the waste behind the flapper and thus dump a sizeable quantity of waste. While this dump can be avoided by closing the valve in two steps by first closing the inner flapper and making sure it latches and then closing the outer cover, waste disposal personnel are not required to and thus generally do not follow this two step procedure.

Another deficiency of the existing drain line sealing devices resides in the fact that they are very difficult to open when frozen. Thus, because of the very low ambient temperatures at normal aircraft cruising altitudes, the waste within and condensation on the exterior of the sealing devices freezes. As a consequence, it is very difficult, if not impossible, to open their hinged valve flappers or remove their sealing plugs immediately after landing without prying the flappers or plugs loose. For this reason, airline waste disposal personnel often attempt to use implements of one kind or another to loosen or pry open a frozen drain line valve or remove a frozen drain line plug. This often damages their sealing surfaces and results in valve or plug leakage in flight.

Even if a frozen plug can be removed or a frozen valve flapper can be opened, the waste behind the plug or inner valve flapper is generally frozen and blocks draining of waste from the aircraft. The existing drain line sealing devices do not permit such a frozen waste blockage to be eliminated in any satisfactory way. For example, about the only way of eliminating such a frozen waste blockage is to use a pick to chip away the frozen mass of waste through the open drain passage which exists after removal of the sealing plug or opening of the inner valve flapper. Since the drain passage is then wide open, however, sudden release or breakup of the frozen waste mass will, and often does, result in a large waste dump. For these reasons, when frozen conditions such as those discussed above exist, airline waste disposal personnel may simply not drain aircraft waste collection tanks, and thereby creates the possibility of even a more serious waste dump during the next aircraft servicing.

The inner valve flappers of many aircraft drain line sealing devices are very difficult to both open and close, whether frozen or not, because of their hinged construction and their use of diametral seal rings, that is, seal rings which seat radially outward against a surrounding cylindrical sealing surface. Thus, a hinged flapper is essentially a cantilever-like arm which is hinged at one end and rotated by a torque applied on its hinge axis to swing its free end laterally toward and away from the flapper valve seat. Forces acting on this free end of the flapper resist pivoting of the flapper with a substantial mechanical advantage. The frozen waste referred to above exerts such resisting forces on the inner flapper. Sliding engagement and disengagement of diametral flapper seal rings also produce substantial frictional resisting forces on the flappers which render opening and closing of the flapper very difficult without lubrication. Such seal ring lubrication is not permitted on aircraft drain line valves, however. The doughnut plugs which are used in some drain line sealing devices are also difficult to remove the reasons mentioned above. Another disadvantage of such plugs resides in the fact that they are radially expanded and contracted by a removable wrench. Quite often when removing or installing such a plug, it will accidently separate from its wrench and will be damaged or lost.

The existing drain line valves having inner hinged flappers have springs which are intended to open the flappers when the flapper latches are released. Quite frequently, these springs are ineffective, however, because they are not strong enough to overcome the above resisting forces exerted on the flappers by ice and diametral seating flapper seal rings.

The above disadvantages of inner valve flappers and doughnut plugs are exacerbated by the material from which the flapper seal rings and the sealing portion of the plugs are fabricated. This material is an elastomer material which tends to swell when contacted by toilet fluids and to harden with age. Both of these characteristics increase the resistance imposed on a flapper during its opening and closing movement and on a plug during its removal and installation. The seal rings of the existing drain line valves are also commonly contained within grooves or the like and retained in the grooves only by friction, rather than by positive retention means. As a consequence, the seal rings frequently drop out of their grooves, particularly after they have swelled and/or hardened somewhat by age, and are either lost or damaged.

The outer cover seals of many existing drain line sealing devices include face-type valve seats about the hose couplings of the devices which are engaged by seal rings on the covers when the covers are closed. These face seats are exposed to potentially damaging contact by the couplings of airline waste disposal hoses when the hoses are connected to or removed from the devices. The prior sealing devices are also have a large number of intricate parts which are difficult to fabricate and assemble so that the prior devices tend to be costly to manufacture and maintain in proper working condition.

Finally, as discussed later, the Federal Aviation Administration has recently issued a new regulation which requires periodic leak testing of aircraft drain valves and flush/fill ports. Because of the design of the existing aircraft drain line sealing devices, the new regulation presents certain problems in connection with the leak testing of such sealing devices.

It is evident at this point, therefore, that there is a definite need for an improved aircraft drain line sealing device.

SUMMARY OF THE INVENTION

This invention provides an improved aircraft waste system drain line valve assembly which avoids the above-mentioned and other deficiencies of the existing drain line sealing devices. Simply stated, the improved valve assembly comprises a valve body having an inlet for connection to the outlet end of an aircraft waste system drain line, an outlet forming a coupling means for releasable connection to the service coupling of a drain hose or the like at an airport facility, a drain passage extending between the inlet and outlet, and inner and outer sealing means arranged in series along the drain passage for redundantly sealing the passage. These two sealing means are uniquely constructed and arranged to provide the improved aircraft drain valve assembly of the invention with the following advantageous features compared the existing drain line sealing devices:

(a) The inner sealing means of the improved valve assembly includes a movable valve member having a sealing surface which slides edgewise across a valve seat about the valve passage during opening and closing movement of the valve member in such a way that the sealing surface tends to wipe the seat free of waste material which might obstruct closing of the valve member and proper sealing contact of the sealing surface with the seat.

(b) The inner valve member, when closed, is positively retained in sealing contact with its valve seat independently of the outer sealing means in such a way that the inner valve member will always contact its valve seat in proper sealing relation, regardless of manufacturing tolerances, wear, and the like, and the possibility of a later unexpected waste "dump" due to waste leakage past the inner valve member owing to improper seating of the inner member, is eliminated.

(c) The sealing surface of the inner valve member, when open, and its valve seat are shielded against direct impact by waste flowing through the valve and hence against damage by sharp or hard objects in the waste, and the sealing surface and valve seat can be easily inspected for wear, damage, cleanliness, and other conditions which might cause waste leakage in flight.

(d) The outer sealing means of the improved drain valve assembly has a sealing surface engagable with a seat about the drain valve outlet which is shielded against damaging contact by the coupling of an airport drain hose being connected to or disconnected from the drain valve outlet.

(e) Both the inner and outer sealing means of the valve assembly can be easily opened without the use of, and therefore without the possibility of damage by, an accessory prying implement or the like, even when the sealing means are tightly frozen shut. Also, a frozen waste blockage in the valve can be eliminated without the danger of a sudden waste "dump".

(f) The inner and outer sealing means of the drain valve assembly, when open, provide a relatively large unrestricted waste flow path through the valve.

(g) The inner and outer sealing means embody seal rings which are firmly caged against inadvertent separation from the valve and are preferably composed of a low friction material, such as ultra HI-molecular weight (UHMW) polyprophylene, which is immune to swelling when exposed to toilet fluids, hardening with age, and the other defects of the elastomer seal rings used in the existing drain port valves.

(h) The improved drain valve assembly of the invention is virtually immune to waste leakage and resulting formation of blue ice during flight of the aircraft on which the valve is installed.

(i) The inner and outer sealing means of the improved drain valve assembly can be quickly and easily independently tested for leaks in a manner which satisfies the recent FAA leak testing regulation.

In the presently preferred drain valve assembly described herein, the outer sealing means is a hinged valve cover which is rotatable between open and closed positions. When closed, a resilient seal ring on the cover engages a valve seat about the outlet end of the valve drain passage. When the cover is open, the drain hose coupling on the valve body is accessible for connection to the service coupling of an airport drain hose. The cover valve seat is recessed in such a way that the seat is shielded against direct impact by waste flowing through the valve and against damaging contact by a service hose coupling being attached to or removed from the valve. The valve seat is tapered so that the seat and cover seal ring separate and engage without imposing any frictional resistance against opening and closing of the cover.

The inner valve member of the preferred drain port valve assembly is a rotary valve member which is rotatable between open and closed positions on a rotation axis intersecting the longitudinal axis of the valve passage, and by a handle accessible externally of the valve body. This valve member has a valve surface which is circularly curved about the rotation axis in planes transverse to the latter axis. When the valve member is closed, its valve surface engages a resilient seal ring about the valve passage to seal the passage. The rotary valve member of the preferred embodiment described herein is a visor-like or ball-like member including a pair of spaced arms integrally joined at one end by a valve portion and having opposite free ends rotatably mounted on the valve body. The valve portion conforms substantially to a spherical segment whose spherical surface forms a sealing surface on the rotary valve member. The valve seat for the rotary valve member is a circular seal ring. This preferred drain port valve assembly of the invention possesses all of the advantageous features enumerated above.

DESCRIPTION OF THE PREFERRED EMBODIMENT

Figure 1:
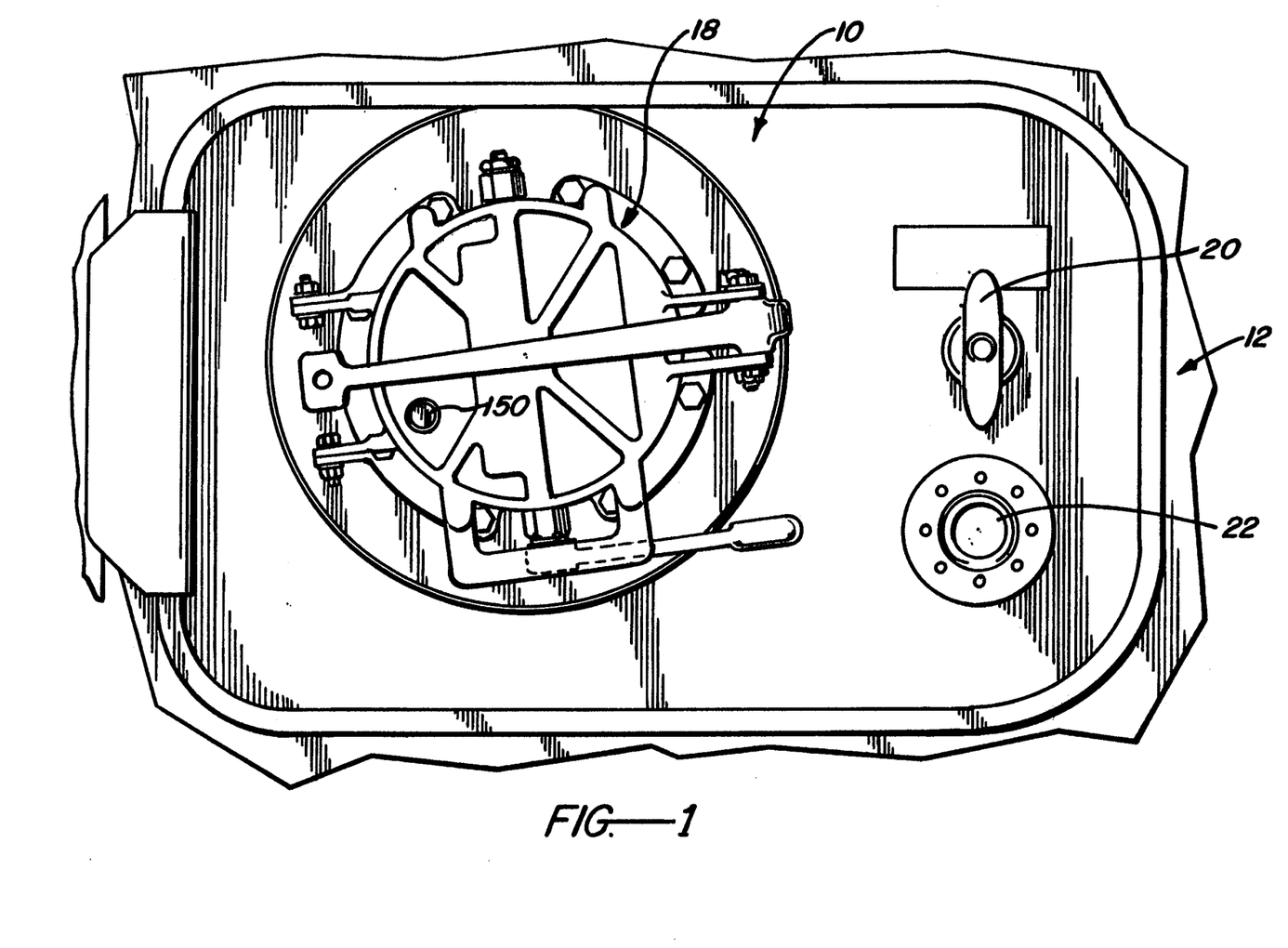
FIG. 1 is a front view of a typical aircraft waste system service panel including an improved drain port valve assembly according to this invention.
Figure 2:
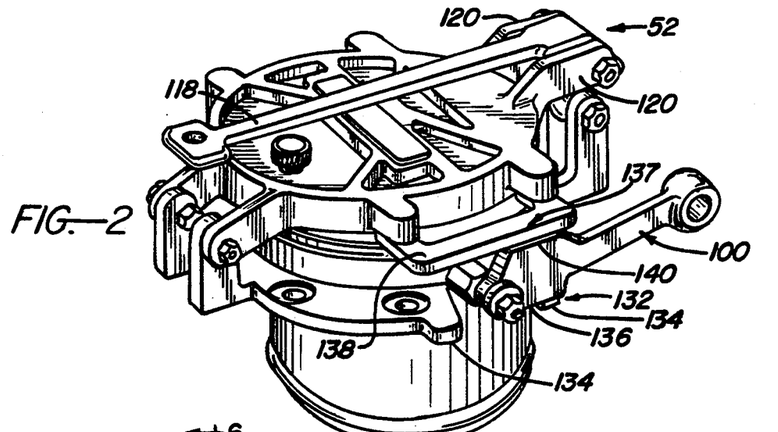
FIG. 2 is an enlarged perspective view of the valve assembly in its closed position.
Figure 3:
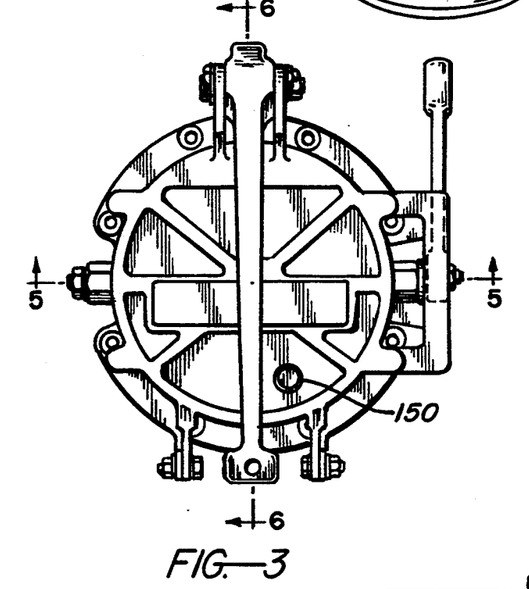
FIG. 3 is front end view of the valve assembly.
Figure 4:
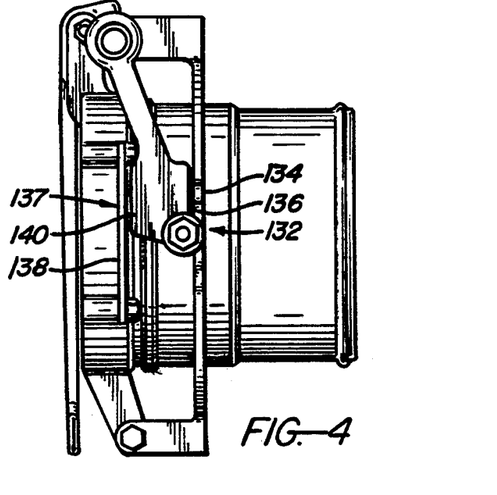
FIG. 4 is a side view of the valve assembly.

Turning now to these drawings, and first to FIG. 1, there is illustrated a typical aircraft waste system service panel 10. The service panel is recessed into the aircraft fuselage 12 and is normally covered by a hinged door which is normally closed and latched flush with the outer surface of the fuselage. Behind the panel is the outlet end of a waste system drain line 16 which communicates to one or more waste collecting tanks (not shown) within the aircraft through a collecting tank drain valve (not shown). Mounted on the service panel 10 is an improved drain valve assembly 18 according to this invention which is connected to the drain line 16 in the manner explained later for sealing the port in flight and draining the aircraft waste collecting tank(s) at an airport facility. Also mounted on the service panel is a handle 20 for opening and closing the collecting tank drain valve and a flush/fill port 22 connected to the collecting tank(s) through a check valve (not shown) within the aircraft, Water is supplied to the collecting tank(s) through this flush/fill port to flush and recharge the tank(s) after they have been drained.

The improved drain valve assembly 18 of the invention will now be described by reference to all of the drawing figures. The valve assembly has a generally tubular valve body 24 one end of which forms a valve inlet 26 and the opposite end of which forms a valve outlet 28. The valve inlet 26 is coupled and sealed to the aircraft drain line 16. The valve outlet 28 is externally configured to form a coupling for releasable connection to a mating service coupling on a waste drain hose 30 located at an airport facility. Extending axially through the valve body 24 is a drain passage 32 having an inlet end extending axially through and opening through the outer end of the body inlet 26 and an opposite outlet end extending axially through and opening through the outer end of the body outlet 28. At the outer end of the passage 32 is an outer passage seal comprising a valve cover means 34 for preventing external leakage. Between this outer seal and the inlet end of the passage 32 is an inner seal comprising valve means 36 for controlling waste flow through the passage and preventing internal leakage.

The outer seal or valve cover means 34 includes a generally disc-shaped valve cover proper 38 having an annular skirt about its edge projecting axially beyond the normally inner side of the cover. The edge of this valve cover is attached to the valve body 24 by a hinge 40. Hinge 40 has a pivot axis 42 disposed substantially in the plane of the cover and located beyond the edge of the cover at one side of the valve body outlet coupling 28. The valve cover 38 is rotatable about the pivot axis 42 between its closed position of FIGS. 2–6A and its open position of FIG. 7. In the closed position of the valve cover 38, a sealing surface 48 at the inner side of the cover engages a conical valve seat 50 about the outlet end of the valve passage 32 to seal the outer passage end against waste leakage through this end. In its open position, the valve cover is located at one side of the valve body hose coupling 28 to permit connection of a waste drain hose 30 to the coupling. The valve cover is releasably locked in its closed position by cover locking means 52 which are operable to lock and unlock the cover and to forceably open the cover, if frozen closed, after it is released to open.

Figures 6, 7:
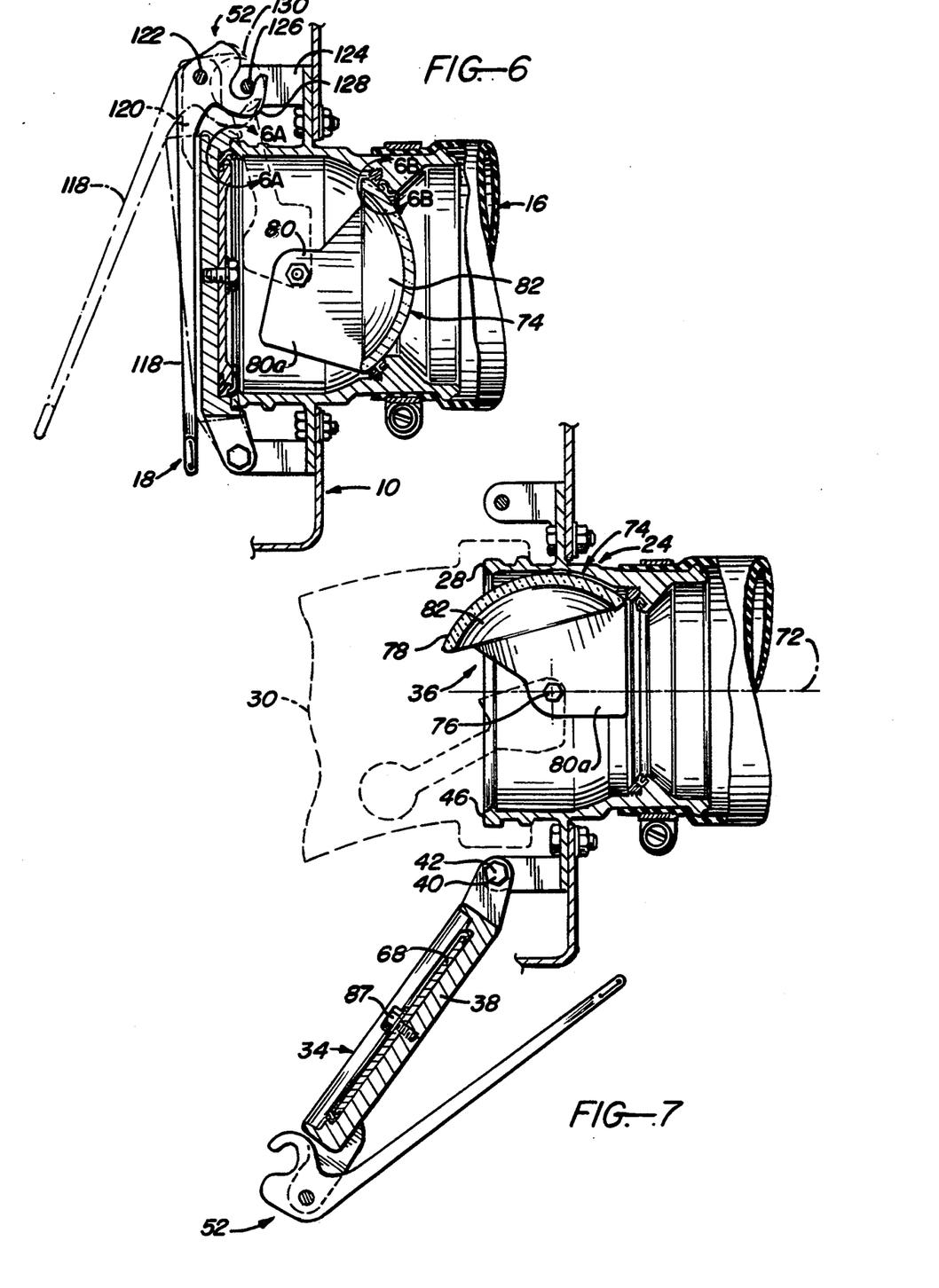
FIG. 6 is an enlarged section taken on line 6—6 in FIG. 3.
FIG. 7 is a section similar to FIG. 6 showing the valve members of the valve assembly in their open positions.
Figure 6A:
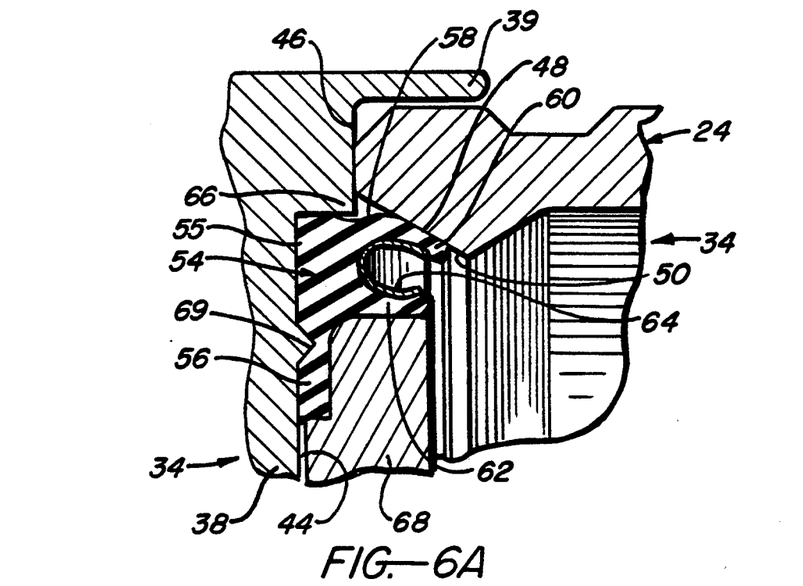
FIG. 6A is an enlargement of the area 6A—6A in FIG. 6.

The inner sealing surface 48 on the valve cover 38 is provided by a resilient seal ring 54 of the kind disclosed in U.S. Pat. No. 4,508,356. This seal ring has a flat base surface 55 and includes a radially inner flange 56 and a radially outer ring portion 58. Seal ring portion 58 is bifurcated to form radially outer and inner ring sections 60, 62. Positioned between these ring sections is an annular spring 64 of U-shape in cross-section which urges the ring sections apart. The radially outer side of the outer ring section 60 constitutes the valve cover sealing surface 48 which engages the conical valve seat 50 when the valve cover 38 is closed. The base surface 55 of the seal ring 54 seats against the inner side of the valve cover 38, with the base of the ring portion 58 seating radially outward against an annular shoulder 66 on the cover. Secured by a bolt 87 to the inner cover side is a seal ring retainer plate 68 which radially overlaps and firmly clamps the seal ring flange 56 to the cover and against an annular serration or sealing rib on the cover. The clamping pressure exerted on the seal ring flange by the retainer plate deforms the flange about the serration to insure a leak-proof seal between the cover and seal ring. The edge of the retainer plate bears against the radially inner seal ring section 62 to restrain this ring section against radially inward deflection.

The cover valve seat 50 surrounds the outlet end of the valve passage 32 axially inward from the outer end edge 46 of the valve body hose coupling 28. This valve seat tapers radially outward as it approaches the edge 46. When the valve cover 38 is closed, its seal ring 54 projects axially into the outlet end of the passage 32, and the radially outer surface 48 of the radially outer ring section 60 is pressed firmly against the conical valve seat 50 by the seal ring spring 64 to form a fluid-tight seal between the valve cover 38 and the valve body 24 about the outlet end of the valve passage 32. Locating the valve seat 50 inwardly of the outer edge 46 of the valve body hose coupling 28 in this way shields the seat against contact with and hence damage by the coupling of a ground service drain hose 30 being secured to or removed from valve body coupling 28. Moreover, the seal ring engaging surface of the valve seat 50 is located radially outward of the radially inner edge of the seat and faces downstream relative to the direction of waste flow through the passage 32. The valve seat 50 is thereby also shielded against direct impact by waste flowing through the passage and hence against direct impact by sharp or hard objects in the waste which might damage the seat and result in leakage past the seat in flight. The skirt 39 on the valve cover 38 projects axially inward beyond the innermost portion of the cover seal ring 54 and shields the seal ring surface 48 against contact and possible damage by the ground service equipment. Because the valve seat 50 is tapered in the manner shown, engagement of the cover seal ring 54 with and separation of the seal ring from the seat during opening and closing of the cover 38 do not resist opening and closing movement of the cover.

The inner seal or valve means 36 of the valve assembly 18 includes an annular valve seat 70 about the valve passage 32 between its ends and coaxial with the longitudinal axis 72 of the passage. At the downstream side of the valve seat 32, relative to the direction of waste flow through the passage, is a valve member 74. This valve member is a rotary valve member which is supported in the valve body 24 for rotation on an axis 76. Rotation axis parallels the hinge axis 42 of the valve cover 38 and is transverse to and intersects the longitudinal axis 72 of valve passage 32. The rotary valve member has a sealing surface 78 which is circularly curved about the rotation axis 76 in planes transverse to the rotation axis. The rotary valve member is rotatable between its closed position of FIG. 6 wherein its valve surface 78 engages the valve seat 70 to seal the valve passage 32 against waste flow through the passage and its open position of FIG. 7 wherein it permits waste flow through the passage.

The preferred rotary valve member 74 shown is a generally U-shaped visor-like or ball-like valve member. For convenience, this valve member is hereafter referred to in most places as a "visor". As will appear from the ensuing description, however, this "visor" functions much like a ball valve and for this reason will be referred to later in the description and in the claims as a ball valve member or the like. Visor 74 has a pair of spaced arms 80 rigidly joined at one end by an integral shell-like valve portion 82 in the shape of a spherical segment bounded by a generally circular edge. The sealing surface 78 of this valve portion is spherically curved about a center point located approximately at the intersection of the longitudinal axis 72 of the valve passage 32 and the rotation axis 76 of the valve member. The visor arms 80 are located at diametrically opposite sides of the valve portion 82 and have opposite free ends mounting coaxial pivots 84, 86 which are aligned on the rotation axis 76. These pivots extend through and are sealed to the valve body 24 at diametrically opposite sides of the passage 32. The pivots are rotatable in the valve body and support the visor 74 in the body for rotation on the axis 76.

Figure 6B:
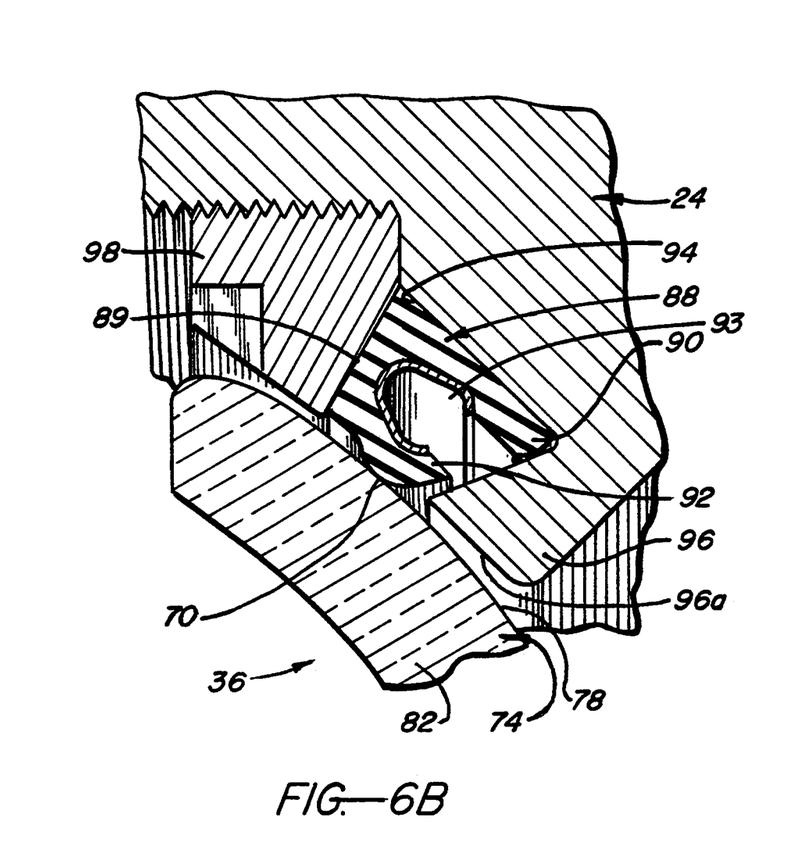
FIG. 6B is an enlargement of the area 6B—6B in FIG. 6.

The valve seat 70 for the rotary valve member or visor 74 is provided by a resilient seal ring 88 coaxial with the longitudinal axis 72 of the valve passage 32. This seal ring is similar to the ring portion 58 of the valve cover seal ring 54 and includes a relatively flat base surface 89, a relatively flat radially outer ring section 90, a radially inner radially inwardly bowed ring section 92, and an annular spring 93 between these sections urging them apart. Seal ring 88 is contained within an annular recess 94 in the downstream side, relative to the waste flow direction though the valve passage 32, of an annular shoulder formation 96 about the passage. The flat radially outer seal ring section 90 substantially seats against the bottom of the recess. The bowed radially inner seal ring section 92 forms, in effect, a lip which projects slightly beyond the downstream surface 96a of the shoulder 96. The outer convex surface of this lip 92 forms the valve seat 70. The seal ring is retained in the recess 94 by an annular nut 98 threaded in the valve passage at the downstream side of the shoulder 96. This nut bears against the flat base 89 of the seal ring.

The valve seat 70, that is, seat seal ring 88, is located at the downstream side of the shoulder 96 radially outward of the radially inner edge of this shoulder, and faces generally downstream of the passage 32. Accordingly, the valve seat 70, like the valve cover valve seat 50, is shielded against direct impact by sharp or hard objects contained in waste flowing through the passage 32 during draining of the aircraft lavatory waste tanks which might cut, score, or otherwise damage the seat and thereby cause valve leakage in flight.

The visor 74 is rotatable between its closed position of FIGS. 1–6 and 6B and its open position of FIG. 7. When the visor is open, the radially inner section or lip 92 of the seal ring 88 assumes a normal relatively unstressed state. In this relatively unstressed state, the radial distance from the center of curvature of the visor sealing surface 78 to the outer convex surface 70 (i.e. valve seat 70) of the lip 92, is substantially uniform about the full circumference of the lip and slightly less than the radius of curvature of the spherical visor sealing surface 78. During closing movement of the visor, its spherical sealing surface 78 engages the seal ring lip 92 and deflects the lip outwardly in such a way that when the visor reaches its fully closed position, the visor sealing surface 78 and seal ring lip contact one another in fluid sealing relation about the full circumference of the valve passage 32 to seal the passage against waste flow or leakage therethrough. The edge of the visor valve portion 82 is contoured or tapered, as shown best in FIG. 6B to permit rotation of the valve portion into and form contact with the seal ring lip 92 without cutting or otherwise damaging the lip. The diameter of the valve portion 82 measured between diametrically opposite points along its circumference is greater than the contact diameter of the seal ring lip 92 in its free position. As a consequence, the visor 74 is rotatable through a range of closed positions, referred to herein as a closed range, throughout which the visor sealing surface 78 remains in sealing contact with the seal ring lip about the full circumference of the passage 32.

Visor 74 is rotatable between its open and closed positions by a handle 100 secured to the visor pivot 84. As is evident from FIG. 1, the space available on an aircraft waste system service panel for a drain valve is quite limited not only because of the relatively small overall area of the panel but also because of the presence of other items, such as the collecting tank drain valve handle 20 and flushing port 22. Owing to this space restriction, it may be preferable or essential to position the valve handle 100 on one side of the valve body 24 for some aircraft waste system service panels and on the other side of the body for other panels. The present drain valve assembly 18 permits this positioning of the handle on either side of the valve body in a simple manner.

To this end, the visor pivots 84, 86 are journalled in and sealed to coaxial bearing portions 102 on opposite sides of the valve body 24. Each pivot is sized for axial insertion into and removal from either bearing and has an inner polygonal end 104 which fits closely but removably within a matching socket 106 in the adjacent visor arm 80. The matching polygonal shapes, shown in FIG. 5A, of the pivot ends 104 and visor arm sockets 106 key the pivots against rotation relative to the visor arms. Each pivot has a circumferential flange 108 which seats against the outer end of the respective bearing 102. Threaded on each bearing is a cap 110 having an internal shoulder 112 at its outer end which engages the outer side of the respective pivot flange 108 to retain the pivot in the bearing. The caps 110 are removable to permit removal and replacement of the pivots 84, 86.

The outer end portion of the handle pivot 84 outwardly of its flange 108 is longer than the outer end portion of the other, or idler, pivot 86. The ball valve handle 100 is mounted at one end on this longer outer end portion of the handle pivot 84. The handle is keyed in a fixed angular position on the handle and is held on the pivot by a nut 114. A nut 116 is threaded on the outer end of the idler pivot 86 to retain its cap 110 on the pivot. It is evident at this point that the visor 74 is rotatable between its open and closed positions by rotating the valve handle 100 back and forth.

Figures 5, 5A:
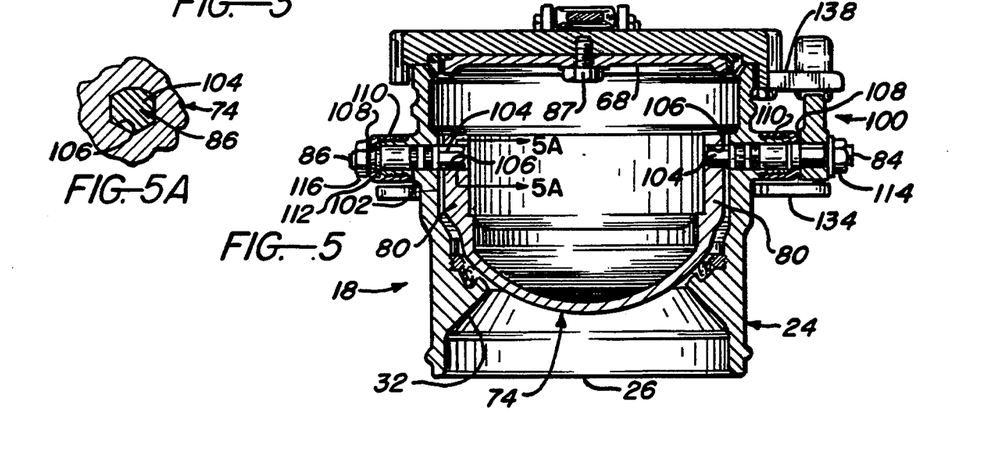
FIG. 5 is an enlarged section taken on line 5—5 in FIG. 3.
FIG. 5A is an enlarged section taken on line 5A—5A in FIG. 5.

As shown in FIG. 5A, the pivot ends 104 and visor sockets 106 have identical matching polygonal shapes to permit mounting the valve handle 100 on either side of the valve body 24, depending on which side is best for the particular aircraft waste system service panel on which the valve assembly is to be installed. Reversal of the handle position is accomplished by removing the handle 100 and its pivot 84 from the visor 74, removing the idler pivot 86 from the visor, reversing the positions of the handle and its pivot and the idler pivot, and then resecuring the pivots to the visor. The matching polygonal shapes of the polygonal end 104 of the pivots 84, 86 and the visor sockets 106 are configured in such a way (with one point of the pivot ends 104 and one inner corner of the pivot sockets correspondingly flattened, as shown in FIG. 5A, for example) that the handle pivot can be inserted into each visor socket 106 in only one angular position about its pivot axis relative to the visor. This assures that the valve handle 100 will always be located in the proper orientation relative to the visor 74 regardless of which side of the valve the handle is located. In the case of the preferred valve assembly illustrated, this proper orientation of the handle is that shown in the drawings.

The visor 74 of the present improved drain valve is vastly superior in several respects to the inner hinged flapper valve of the prior drain valves. For example, when the visor is open, its valve portion 82, and hence also its sealing surface 78, are located at one side of the passage 32, and the sealing surface faces laterally of and away from the passage. The sealing surface is thereby shielded against impact and damage by sharp or hard objects in the waste flowing through the passage which might cause the valve to leak in flight. In contrast, when the inner hinged flapper valve of a prior drain valve is open, the seal ring on the flapper is exposed to direct impact and possible leak-causing damage by the flowing waste. Another advantage of the visor 74 resides in the fact that during its opening and closing movement, its sealing surface 78 slides edgewise across and wipes the valve seat 70, and the valve seat, in turn, wipes the sealing surface. The rotary visor also tends to wipe any waste in its path to its downstream side. This wiping action removes waste material from the visor sealing surface and its valve seat and thereby assures proper sealing contact of the sealing surface with the seat each time the visor is closed. In contrast, opening and closing movement of the prior inner flapper valve occurs transverse to its valve seat, and waste material adhering to the valve or the seat prevents proper sealing contact of the valve with the seat. As shown in FIGS. 6 and 7, the visor arms 80 are enlarged edgewise in the direction of the arm edges which are the upstream edges of the arms when the visor occupies its open position of FIG. 7 to form skirts 80a. When the visor is open, these skirts act to prevent waste effluent from entering between the visor and the valve body while providing full visibility of the seal ring 88, as discussed below.

The unique U-shape of the visor 74 with its projecting skirts 80a provides a relatively large unrestricted flow path through the valve and exposes virtually the entire valve seat 70 to view through the valve outlet when both the visor and the valve cover 38 are open. The visor is also rotatable to a position in which the majority of its sealing surface 78 is exposed to view through the valve outlet. This permits inspection of the visor surface and valve seat for cleanliness and damage and for cleaning or replacement, if neccessary, before the drain valve assembly is finally closed for flight. In this regard, it will be seen that the outlet end of the valve passage 32 is sufficiently large in diameter to permit removal and replacement of the visor 74 and the inner seal ring 88. The visor and seal ring are removed in the following manner. With the valve cover 38 and visor 74 in their open positions, the threaded pivot retaining caps 110 are backed off, i.e. unthreaded, first one cap and then the other, in such a way as to withdraw the pivots 84, 86 from their visor sockets 106. In order to facilitate this procedure, the cap threads are preferably high lead threads. Withdrawal of the pivots from the visor sockets frees the visor 74 for removal through the open outlet end of the valve passage 32. After the visor has been thus removed, the seal ring 88 is removed by unthreading its retaining nut 98 from the valve body, removing the nut through the outlet end of the valve passage, and then removing the seal ring through this passage end. As mentioned earlier, the inner seal ring 88 and the cover seal ring 54 are composed of a material, such as HI-molecular weight polypropylene, which is immune to swelling when exposed to toilet fluids and to hardening with age. When properly installed in the valve, the seal rings are firmly secured against accidental separation from the valve and resultant loss or damage.

Two further advantages of the present drain valve assembly are the ability of the valve visor 74 to be opened, when frozen closed, with much less force than a frozen flapper valve, and the ability of the visor to be progressive opened for chipping away a frozen waste blockage upstream of the visor and then reclosed, which permits the service drain hose coupling to be attached to the drain valve and without the possibility of a sudden large waste "dump". In this regard, it was mentioned previously that the intense cold at the normal cruising altitudes of commercial aircraft freezes the aircraft drain port valves in their closed positions and freezes waste material within the valves. Even if the ground temperature to which the valves are exposed after landing is well above freezing, the valves and waste often remain frozen for some time. As a result, conventional drain port valves are often very difficult or impossible to open, and even if opened often cannot be used to drain waste from the aircraft, all within the time permitted for servicing the aircraft waste system. This often results in the undesireable actions of ground personnel and their potentially serious consequences discussed earlier.

The present drain port valve assembly 18 avoids these problems and their consequences. Thus, because the visor 74 rotates rather than pivots as does a flapper valve, and because the visor surfaces move or slide edgewise relative to the valve body surfaces rather than transverse to the body surfaces as do flapper valve surfaces, the visor can be opened with much less force by lever operation only, even when frozen closed, than can a flapper valve. Moreover, during opening movement of the visor, it uncovers the central waste flow opening through its valve seat 70 progressively like a sliding gate valve. This permits a frozen waste blockage behind the seat to be removed, without the risk of a sudden large waste "dump", by opening the visor and chipping away the frozen waste mass through the small valve seat opening, then opening the valve a bit more and chipping away more of the frozen mass, and so on until a sufficient opening is created through the frozen mass to permit fluid flow from the aircraft waste tanks. The visor is then reclosed, a service drain hose is connected to the drain valve, and the visor is reopened to effect fluid flow from the aircraft through this opening. The fluid is near cabin ambient temperature as it leaves the aircraft tank(s) and melts the remaining frozen waste mass to permit relatively rapid completion of servicing.

The locking means 52 for the hinged valve cover 38 permits the cover to be easily opened even when tightly frozen closed. This cover locking means comprises a long locking lever 118 pivotally mounted at one end between a pair of spaced bracket arms 120 extending radially out from the edge of the cover 38 diametrically opposite the cover hinge 40. The pivoted end of the lever is located beyond the edge of the cover. The lever pivot axis 122 parallels the cover hinge axis 42. Rigidly mounted between a pair of bracket arms 124 on the valve body 24 is an eccentric bolt 126 which forms a keeper. This bolt parallels the lever pivot axis 122 and is located to underlie the pivoted end of the locking lever 118 when the valve cover 38 is closed. The pivoted end of the lever is shaped to form a curved tongue-like locking cam 128 along the normally inner edge of the lever. During counter-clockwise rotation of the lever in FIG. 6 to its solid locking position with the valve cover closed, this locking cam engages under the keeper bolt 126 to lock the cover closed. It will be observed that the lever and keeper are arranged to engage in locking relation with an over-center, toggle-like action which retains the lever in its locking position. The keeper bolt 126 is rotatably adjustable in the bracket arms 124 about a longitudinal axis eccentric to the central longitudinal axis of the bolt and includes a nut threaded on the bolt for securing the bolt in adjusted position about the eccentric axis. The bolt is adjustable to provide the latching engagement between the bolt and the lever locking cam 128 neccessary to produce the desired locking force on the valve cover 38 and to compensate for manufacturing tolerances and wear.

The pivoted end of the lever 118 is also shaped to form an ice breaking cam 130 for prying the valve cover 38 open in the event it is frozen or otherwise stuck in the closed position. The lever is rotatable clockwise in FIG. 6 from its solid line cover locking position, through its dotted line cover releasing position, to its phantom line cover opening position. Rotation of the lever from its solid line cover locking position to its broken line cover releasing position retracts the locking cam 130 from engagement with the keeper 126 to release the valve cover 38 for opening without producing any opening movement of the cover. Continued rotation of the lever from its broken line cover releasing position to its phantom line cover opening position engages its ice breaking cam 130 with the keeper 126 in such a way as to exert a camming force on the valve cover 38 in a direction to force pry the cover open. This camming action of the locking lever 118 provides an ice breaking function which enables the cover to be easily opened even though it is tightly frozen shut.

As mentioned earlier, the valve visor 74 has a closed range, i.e. a range of closed positions, throughout which it remains in fluid sealing contact with its valve seat 70 to block fluid leakage through the passage 32. Closing movement of the visor 74 is limited to a closed position within this closed range by coacting stop means 132 on the visor and the valve body 24. These coacting stop means comprise an external flange 134 on the valve body and a stop formation 136 on the valve handle 100 engagable with the flange. Each side of the body has a flange so that the position of the handle may be reversed as explained earlier. The valve cover 38 and visor 74 have coacting means 137 for closing the visor 74 and retaining the visor within its closed range when the valve cover is locked closed. Coacting means 137 comprises a retaining member 138 on the cover and a formation 140 on the valve handle 100 which the retaining member engages during closure of the cover. When the cover is locked closed, the valve handle 100 is confined between the stop flange 134 and the retaining member 138 which retain the handle in a position wherein the visor 74 is located within its closed range. The retaining member 138 is movable from one side of the valve cover to the other when reversing the position of the handle.

Regarding this visor retaining function of the valve cover 38, it is significant to recall from the earlier discussion that one deficiency of prior art aircraft drain inner port valves resides in the fact that while their inner flapper valve is designed to be closed by closing the outer valve and to automatically latch closed, manufacturing tolerances, wear, and other factors, may be such that the closed flapper does not actually latch. This failure of the inner flapper to latch closed in not immediately evident and results in the undesirable consequences mentioned earlier. The present improved valve assembly avoids this problem in two ways. First, in contrast to the prior valves, the valve cover 38 of the present valve assembly merely positions the valve visor 74 within its closed range, while ensuring that cover closure closes the inner valve as well. The visor is positively retained in sealing contact with its valve seat 70 totally independently of the cover or any latching function. That is to say, the valve cover and the visor are each held in fluid sealing contact with their respective valve seats by totally independent means, namely the cover locking means 52 in the case of the valve cover, and the pivots 84, 86 in the case of the visor 74. Accordingly, seating pressure of the visor against its valve seat is totally independent of the valve cover or any latching function. Secondly, the fact that the visor 74 has a range of closed positions throughout which it remains in firm fluid sealing contact with its valve seat 70 effectively compensates for manufacturing tolerances and wear in a manner which assures proper sealing contact of the visor with its valve seat in all manufactured valves and over a long service life.

The improved drain port valve assembly of the invention is mounted on an aircraft waste system service panel in any convenient way. The illustrated valve assembly 18, for example, extends through an opening in the service panel and is attached to the panel by bolts passing through the valve body flange 134. The valve body inlet 26 is coupled to the aircraft drain line 16 in the manner shown. It is now evident that the improved drain port valve assembly of the invention possesses all of the advantages mentioned earlier.

The operation of the improved drain port valve assembly 18 will now be described. As mentioned earlier, while the inner rotary valve member 74 has been referred up to this point as a visor, primarily because of its visor-like shape and movement, it is evident that the visor functions very much like a ball valve. In flight, the valve cover 38 is locked closed and retains the visor or ball valve 74 in its closed range. The service panel door 14 is latched closed. After landing at an airport facility, the panel door 14 is opened, and the outer valve cover 38 is unlocked and opened. The service coupling of an airport waste drain hose 30 is then connected to the hose coupling 28 of the valve assembly 18, after which the aircraft waste collecting tank valve 20 and the inner ball valve 74 of the drain valve assembly are opened to drain waste from the aircraft collecting tank. The ice breaking action of the valve cover locking means 52 permits the valve cover 38 to be opened with ease even when frozen shut. The progressive opening feature of the ball valve 74 permits removal, in the manner described earlier, of a frozen waste blockage in the drain valve assembly without the risk of a sudden large waste "dump". After the aircraft tank has been emptied, it is flushed and recharged through the flush/fill fitting 22 on the service panel, and the service drain hose 30 is removed. The valve seats 50, 70 and valve ball sealing surface 78 of the valve assembly may be inspected at this time through the valve outlet 28, and, if neccessary, damaged valve seals and surfaces may be repaired or replaced. The ball valve 74 and valve cover 38 of the valve assembly are then reclosed and locked for flight.

As mentioned earlier, the Federal Aircraft Administration (FAA) recently issued a new aircraft waste system test regulation which currently applies only to certain aircraft but will soon apply to other aircraft as well. This new regulation requires, among other things, that the aircraft service panel drain valves be checked for leaks every 200 hours of flight time. In the case of the aircraft to which the regulation currently applies, this translates into checking each aircraft at approximately 23 day intervals. These tests take about 6 to 8 manhours to conduct and are much disliked by the airlines. The present improved drain valve assembly facilitates and enhances such tests and thus provides a significant contribution to the art of aircraft service panel drain valves and drain valve testing.

Two basic drain valve leak test procedures have been devised. One of these procedures involves limited pressurization of the aircraft cabin. The other procedure involves the use of a vacuum fixture. Both procedures are performed after the aircraft waste tanks have been drained, flushed and refilled. An understanding of the benefits of the present drain valve assembly with regard to these leak test procedures does not require a detailed step by step explanation of the procedures. Suffice it to say that the cabin pressurization test procedure involves, in part, checking the drain valves on the aircraft service panels for leaks while the aircraft cabin is pressurized to about 3 psi above ambient with the inner drain valve seals closed. Pressurization of the cabin pressurizes the water in the aircraft tanks and thereby the water in contact with the closed inner seals of the drain valves so that water will be expelled through any leaks in the drain valves. The vacuum fixture procedure involves placing what amounts to a vacuum chamber over the drain valve(s) on each service panel, evacuating the chamber to a reduced pressure of about 3 psi below ambient to create a corresponding pressure differential across the inner valve seal(s), and observing the valve(s) through a window in the chamber to check for any leaks.

The construction and arrangement of the conventional drain valves mentioned earlier greatly limit the reliability and usefulness of such leak tests. In the first place, the test procedures as commonly practiced check only the inner drain valve seals for leaks. While it is possible to check both the inner and outer valve seals for leaks, to do so presents certain problems which test personnel generally do not want to face. Checking both seals of a doughnut plug drain valve, for example, requires initial testing of the valve with the inner doughnut plug in place and the outer valve cover open, removal of the plug, and retesting of the valve with its cover closed. Similarly, testing of both seals of a drain valve with an inner flapper-type seal requires initial testing of the valve with the inner flapper closed and the outer valve cover open, removal of the flapper or the inner seal, and repetition of the test with the cover closed. This removal of the inner flapper or seal destroys the valve integrity and requires retesting of the valve for leaks after the flapper or seal is reassembled in the valve.

Moreover, testing of the inner valve seals with the outer valve covers open does not provide a reliable leak test since in the normal in-flight condition of such valves, their covers are closed and provide structural support for their inner seals. Further, even assuming that the existing drain valves pass a 200 hour leak test, the valves are reliable for leak-proof operation until the next leak test only to the extent that the valve seals are not closed on contaminants during intervening servicing of the aircraft waste handling systems to cause leaks to occur. Thus, because of their designs, the existing valves cannot be readily inspected to avoid such closing of their inner valve seals on contaminants. As a consequence, periodic testing of the valves does not in and of itself insure leak-proof operation of the valves in the intervals between leak tests. In contrast, the design of the improved drain valve of the invention permits it to be readily inspected and, if neccessary, cleaned and/or repaired in the manner explained earlier during each aircraft ground servicing to avoid such improper closing and resultant leaking of the valve.

The improved drain valve assembly 18 of the invention permits independent testing, with relative ease, of both the outer cover seal and the inner visor or ball valve seal using either the cabin pressurization procedure or the vacuum procedure discussed above. In each procedure, the drain valve is tested in the usual manner first with the outer valve cover 38 open and the inner visor or ball valve 74 closed, so that fluid pressure is applied to the inner visor or valve ball seal, and then with the outer cover closed and the inner visor or ball valve open so that fluid pressure is applied to the outer cover seal. To this end, the retaining member 138 is removed from the valve cover 38 prior to the test to permit opening of the visor or ball valve and closing of the cover during the test and thereby avoid the neccessity of removing the ball valve during the test.

According to an additional and very important feature of the invention, the drain valve assembly 18 is provided with a capped test port 150 to which a vacuum/pressure source (not shown) may be releasably connected. This port opens to the valve passage 32 between the cover valve seat 50 and the visor or ball valve seat 70 and permits leak testing of the drain valve in a few minutes, after each ground servicing of the aircraft if desired, by successively evacuating and pressurizing the valve with the valve cover 38 and visor or ball valve 74 closed. The test port has a cap which normally seals the port against fluid leakage and is removable to permit connection of the port to the vacuum/pressure source during leak testing of the valve.

The inventors claim:

1. A drain valve assembly for sealing an aircraft waste system drain line, comprising:

a valve body to be mounted on the aircraft including a tubular coupling portion having an outer end for releasable coupling engagement with a drain hose coupling into which the valve body coupling portion is inserted, said coupling portion terminating in an annular outer end edge, and said valve body containing a drain passage having an inlet end for receiving waste from said drain line and an opposite outlet end extending axially through and opening through the outer end of said coupling portion, whereby waste flow through said passage occurs in a flow direction toward said passage outlet end, and sealing means including a valve seat within the outer end of said coupling portion circumferentially surrounding said passage outlet end axially inward of said end edge of the coupling portion, whereby said valve seat is shielded against damage by contact with a drain hose coupling during connection of the hose coupling to and disconnection of the hose coupling from said valve body coupling, a valve cover, seal means on one side of said valve cover, and means pivotally mounting said valve cover on said valve body at one side of said coupling portion for swinging between (a) a closed position wherein said valve cover is located opposite said outer end of said coupling portion with said one side of the cover facing and disposed in close proximity to said outer end and said cover seal means is disposed within the outer end of coupling portion and engages said valve seat in fluid sealing relation to block flow through said passage, and (b) an open position wherein said valve cover is located at said one side of said coupling portion to permit connection of a drain hose to said valve body coupling for drainage flow through said passage into the drain hose.

2. A drain valve assembly according to claim 1, wherein:

said valve seat tapers radially outward toward said outer end edge of said coupling portion.

3. A drain valve assembly according to claim 1, including:

second sealing means in said passage comprising a second valve seat about said passage between said first mentioned valve seat and said passage inlet end, a rotary ball valve downstream of said second valve seat having a spherical sealing surface, and means rotatably mounting said ball valve in said valve body for rotation between a closed position wherein said ball sealing surface engages said second valve seat in fluid sealing relation to block flow through said passage and an open position wherein said ball sealing surface is spaced from said second valve seat to permit flow through said passage.

4. A drain valve assembly according to claim 3, wherein:

both of said valve seats face generally downstream relative to said flow direction, and said ball sealing surface is located at one side of said passage and faces laterally of and away from said passage in said open position of said ball valve, whereby both valve seats, said valve cover seal means, and said ball sealing surface are shielded against direct impact by drainage flowing in said direction through said passage with said valve cover and ball valve in their open positions.

5. A drain valve assembly for sealing an aircraft waste system drain line, comprising:

a valve body to be mounted on the aircraft, said valve body containing a passage having an inlet end for receiving waste from said drain line and an opposite outlet end, whereby waste flow through said passage occurs in a flow direction toward said outlet end, a valve seat on said valve body about said passage outlet end, a valve cover including a sealing surface on one side of the cover, means pivotally mounting said valve cover on said valve body at one side of said passage outlet end for swinging between a closed position wherein said valve cover is located opposite said passage outlet end and said sealing surface engages said valve seat in fluid sealing relation to block flow through said passage, and an open position wherein said cover is spaced from said passage outlet end to permit flow through said passage, cover locking means operative between said cover and valve body for locking said cover in closed position and releasing said cover to open and exerting an opening force on said cover when the cover is released to open, thereby to forceably open the cover if it is frozen in its closed position, and wherein said cover locking means comprises a pivoted lever on said cover rotatable to a cover locking position, a cover releasing position, and a cover opening position, and coacting means on said lever and valve body, whereby rotation of said lever to said cover locking position locks said cover closed, rotation of said lever to releasing position releases said cover for opening, and rotation of said lever to said opening position exerts an opening force on said cover.

6. A drain valve assembly according to claim 5, wherein:

said coacting means comprises a locking tongue on said lever, means engagable by said locking tongue to lock said cover closed by rotation of said lever to said cover locking position and disengaged from said tongue to release said cover for opening by rotation of said lever to said cover releasing position, a cam on said lever and means engagable by said cam to exert an opening force on said cover by rotation of said lever to said cover opening position.

* * * * *